US009690638B2

(12) United States Patent
Shi et al.

(10) Patent No.: US 9,690,638 B2
(45) Date of Patent: Jun. 27, 2017

(54) SYSTEM AND METHOD FOR SUPPORTING A COMPLEX MESSAGE HEADER IN A TRANSACTIONAL MIDDLEWARE MACHINE ENVIRONMENT

(75) Inventors: Peizhi Shi, Beijing (CN); Yongshun Jin, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 166 days.

(21) Appl. No.: 13/415,712

(22) Filed: Mar. 8, 2012

(65) Prior Publication Data

US 2013/0086149 A1 Apr. 4, 2013

Related U.S. Application Data

(60) Provisional application No. 61/541,056, filed on Sep. 29, 2011.

(51) Int. Cl.
*G06F 9/54* (2006.01)
*H04L 12/861* (2013.01)
(Continued)

(52) U.S. Cl.
CPC ............ *G06F 9/546* (2013.01); *G06F 15/167* (2013.01); *G06F 17/30227* (2013.01); *H04L 49/9036* (2013.01); *H04L 69/22* (2013.01)

(58) Field of Classification Search
CPC ................. G06F 9/54; G06F 15/17331; G06F 9/546–9/548; G06F 9/542; G06F 9/544;
(Continued)

(56) References Cited

U.S. PATENT DOCUMENTS 6,615,282 B1 9/2003 Futral
6,766,358 B1 7/2004 Chesson et al.
(Continued)

FOREIGN PATENT DOCUMENTS

CN 1792076 6/2006
CN 101208671 6/2008
(Continued)

OTHER PUBLICATIONS bea, "What are IPC Message Queues", 2001, http://docs.oracle.com/cd/E13203_01/tuxedo/tux80/atmi/intinf42.htm, pp. 1-2.*
Wikipedia, Tuxedo_(software), retrieved 2016, https://en.wikipedia.org/wiki/Tuxedo_(software), pp. 1-8.*
Grun, Introduction to InfiniBand for End Users [online], 2010, InfiniBand Trade Association, retrieved on Nov. 21, 2012, http://www.mellanox.com/pdf/whitepapers/Intro_to_IB_for_End_Users.pdf, 54 pages.
(Continued)

*Primary Examiner* — Gregory Todd
(74) *Attorney, Agent, or Firm* — Tucker Ellis LLP

(57) ABSTRACT

A flexible transactional data structure can be used to store message header in a transactional middleware machine environment. The flexible transactional data structure can have dynamic numbers of fields and is accessible via specified IDs. The message header can include a first data structure that stores address information for accessing a client using a first message queue, and a second data structure that stores address information for accessing a client using a second message queue. The first type of server operates to use only the first data structure to obtain the address information for accessing the client using the first message queue. The second type of server operates to obtain a key from the first data structure first, and then use the key to obtain from the second data structure the address information for accessing the client using the second message queue.

20 Claims, 3 Drawing Sheets

(51) Int. Cl.
  *G06F 17/30* (2006.01)
  *G06F 15/167* (2006.01)
  *H04L 29/06* (2006.01)

(58) Field of Classification Search
  CPC ............ G06F 15/167; G06F 17/30227; H04L 49/9036; H04L 69/22
  USPC .................. 709/203, 212–217; 719/311–314
  See application file for complete search history.

(56) References Cited

U.S. PATENT DOCUMENTS

| | | | |
|---|---|---|---|
| 6,938,138 B2* | 8/2005 | Beukema et al. | 711/163 |
| 7,171,484 B1* | 1/2007 | Krause et al. | 709/232 |
| 7,281,030 B1* | 10/2007 | Davis | 709/212 |
| 7,454,501 B2 | 11/2008 | Wilcock | |
| 7,574,536 B2* | 8/2009 | Johnsen et al. | 710/22 |
| 7,620,693 B1* | 11/2009 | Mott et al. | 709/213 |
| 7,711,793 B1 | 5/2010 | Wilson | |
| 7,849,228 B2 | 12/2010 | Boyd et al. | |
| 7,944,920 B2 | 5/2011 | Pandya | |
| 7,990,994 B1* | 8/2011 | Yeh et al. | 370/431 |
| 2002/0186692 A1 | 12/2002 | Chang | |
| 2003/0061417 A1 | 3/2003 | Craddock | |
| 2004/0015622 A1* | 1/2004 | Avery | 710/22 |
| 2005/0050549 A1 | 3/2005 | Joseph et al. | |
| 2005/0203961 A1 | 9/2005 | Mehra | |
| 2005/0220128 A1 | 10/2005 | Tucker et al. | |
| 2005/0254493 A1* | 11/2005 | Chang et al. | 370/389 |
| 2007/0168454 A1 | 7/2007 | Ben-Yehuda | |
| 2007/0183418 A1 | 8/2007 | Riddoch et al. | |
| 2008/0126509 A1* | 5/2008 | Subramanian et al. | 709/214 |
| 2008/0168471 A1 | 7/2008 | Benner et al. | |
| 2008/0294712 A1 | 11/2008 | Lu et al. | |
| 2010/0183024 A1* | 7/2010 | Gupta | 370/463 |
| 2010/0238796 A1* | 9/2010 | Supalov | 370/225 |
| 2011/0078214 A1* | 3/2011 | Michaylov et al. | 707/809 |
| 2011/0142043 A1 | 6/2011 | Oved | |
| 2012/0216216 A1 | 8/2012 | Taboada | |
| 2012/0221621 A1 | 8/2012 | Sugawara | |

FOREIGN PATENT DOCUMENTS

| | | |
|---|---|---|
| CN | 101227379 | 7/2008 |
| JP | H11-024945 | 1/1999 |
| JP | 2000-020490 | 1/2000 |
| JP | 2010-165022 | 7/2010 |
| JP | 2010165022 | 7/2010 |
| JP | 2011170772 | 9/2011 |
| WO | 9954817 | 10/1999 |
| WO | 9957620 | 11/1999 |

OTHER PUBLICATIONS

Forin et al., High-Performance Distributed Objects Over System Area Networks, Proceedings of the 3rd Usenix Windows NT Symposium Usenix Assoc., Berkeley, CA, USA, 1999, pp. 21-30.
Ishizaki et al., CrispORB: High Performance CORBA for System Area Network, High Performance Distributed Computing, 1999, Proceedings of the Eighth International Symposium, Redondo Beach, CA, USA, Aug. 3-6, 1999, IEEE Comput. Soc., Los Alamitos, CA, USA, Aug. 3, 1999, pp. 11-18.
International Searching Authority, International Search Report and Written Opinion for PCT International Patent Application No. PCT/US2012/057121, Dec. 11, 2012, 10 pages.
International Searching Authority, International Search Report and Written Opinion for PCT International Patent Application No. PCT/US2012/056950, Nov. 20, 2012, 10 pages.
International Searching Authority, International Search Report and Written Opinion for PCT International Patent Application No. PCT/US2012/056945, Feb. 7, 2013, 9 pages.
Song, et al., Middleware Technology and Grid Computing, Dec. 31, 2004, 5 pages, Software Engineering and Standardization vol. 11.
State Intellectual Property Office of the People's Republic of China, Office Action Dated Jul. 28, 2016 for Chinese Patent Application No. 201280047483.X, 6 Pages.
State Intellectual Property Office of the People's Republic of China, Office Action Dated Apr. 5, 2016 for Chinese Patent Application No. 201280047477.4, 11 Pages (11 Page English Translation).
Qiao Nan et al., "Infiniband Architecture for High Performace Network Servers", (Institute of New Type Machine, College of Telecommunications, Xi' An Jiaotong University, Xi' An Shanxi 710049, China), © 1994-2016 China Academic Journal Electronic Publishing House, 4 Pages.
Zhao Zhenlong et al., "A New High Performance Reliable Scalable Next Generation I/O Architecture for Server", (School of Computer Science & Technology, Huazhong Jniversity of Science Technology, Wuhan 430074), © 1994-2016 China Academic Journal Electronic Publishing House, 5 Pages.
Shen Li, "Research and Implementation of Infiniband Network Interface" A Thesis for the Professional Degree of Master of Engineering in Computer Technology Graduate School of National University of Defense Technology, Changsha, Hunan, People's Republic of China, Mar. 2010, 75 Pages.
Jim Gray, 'Transaction Processing', 2nd vol., 1st ed., Japan, Nikkei Business Publications, Rikiya Okabe, Oct. 29, 2001, pp. 1134-1136.
European Patent Office, Extended European Search Report for EP12835235.8, Aug. 28, 2015, 10 pages.
European Patent Office, Extended European Search Report for EP12835383.6, Aug. 31, 2015, 12 pages.
Unknown Author, BEA MessageQ, MQ Series Connection User's Guide, Feb. 1, 1999, 123 pages.

* cited by examiner

SYSTEM AND METHOD FOR SUPPORTING A COMPLEX MESSAGE HEADER IN A TRANSACTIONAL MIDDLEWARE MACHINE ENVIRONMENT

CLAIM OF PRIORITY

This application claims the benefit of priority on U.S. Provisional Patent Application No. 61/541,056, entitled "SYSTEM AND METHOD FOR SUPPORTING A COMPLEX MESSAGE HEADER IN A TRANSACTIONAL MIDDLEWARE MACHINE ENVIRONMENT" filed Sep. 29, 2011, which application is herein incorporated by reference.

CROSS-REFERENCED APPLICATIONS

The current application hereby incorporates by reference the material in the following patent applications:

U.S. patent application Ser. No. 13/415,670, entitled "SYSTEM AND METHOD FOR PREVENTING SINGLE-POINT BOTTLENECK IN A TRANSACTIONAL MIDDLEWARE MACHINE ENVIRONMENT," filed Mar. 8, 2012, which is now U.S. Pat. No. 9,116,761, issued on Aug. 25, 2015; and U.S. patent application Ser. No. 13/415,700, entitled "SYSTEM AND METHOD FOR SUPPORTING DIFFERENT MESSAGE QUEUES IN A TRANSACTIONAL MIDDLEWARE MACHINE ENVIRONMENT," filed Mar. 8, 2012, which is now U.S. Pat. No. 8,832,217 issued on Sep. 9, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a transactional middleware machine environment.

BACKGROUND

A transactional middleware system, or a transaction oriented middleware, includes enterprise application servers that can process various transactions within an organization. With the developments in new technologies such as high performance network and multiprocessor computers, there is a need to further improve the performance of the transactional middleware. These are the generally areas that embodiments of the invention are intended to address.

SUMMARY

Described herein is a system and method for supporting a complex message header in a transactional middleware machine environment. The complex message header includes a first data structure that stores address information for accessing a transactional client using a first message queue, and a second data structure that stores address information for accessing the transactional client using a second message queue. The first type of transactional server operates to check the first data structure in the complex message header to obtain the address information for communicating with the transactional client using the first message queue. The second type of transactional server operates to obtain a key from the first data structure in the complex message header, and use the key to obtain the address information from the second data structure in the complex message header for communicating with the transactional client using the second message queue.

DETAILED DESCRIPTION

Figure 1:
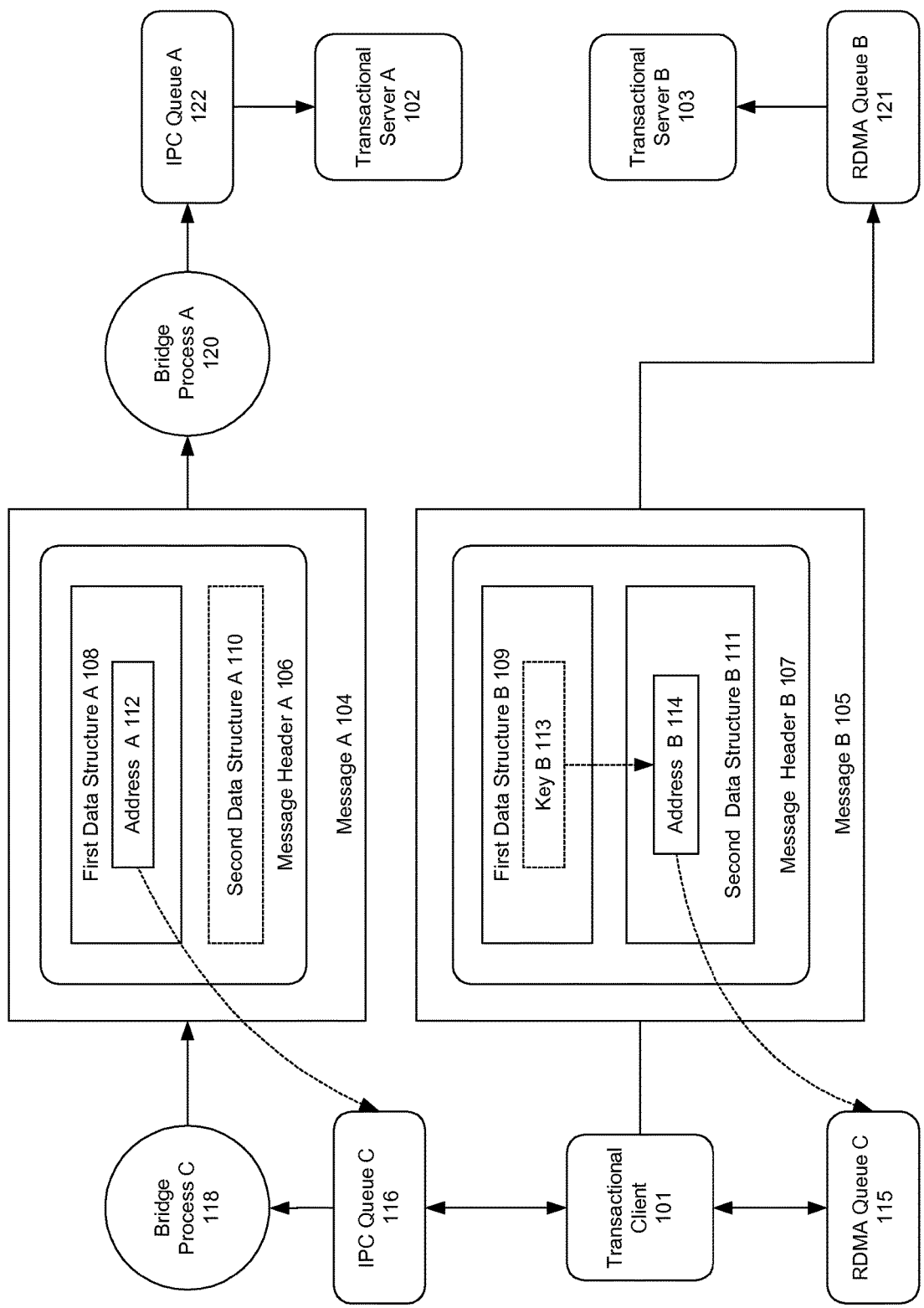
FIG. 1 shows an illustration of a transactional middleware machine environment that supports a complex message header, in accordance with an embodiment of the invention.

Described herein is a system and method for supporting a transactional middleware system, such as Tuxedo, that can take advantage of fast machines with multiple processors, and a high performance network connection. A flexible transactional data structure can be used to store message header in a transactional middleware machine environment. The flexible transactional data structure can have dynamic numbers of fields and is accessible via specified IDs. The message header can include a first data structure that stores address information for accessing a client using a first message queue, and a second data structure that stores address information for accessing a client using a second message queue. The first type of server operates to use only the first data structure to obtain the address information for accessing the client using the first message queue. The second type of server operates to obtain a key from the first data structure, and then use the key to obtain from the second data structure the address information for accessing the client using the second message queue.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Additionally, a transactional middleware system, such as a Tuxedo system, can take advantage of fast machines with multiple processors, such as Exalogic middleware machine, and a high performance network connection, such as an Infiniband (IB) network.

In accordance with an embodiment of the invention, a transactional middleware system can exchange messages between a local machine and a remote machine using Remote Direct Memory Access (RDMA) protocol to achieve short latency in a manner like a local message transfer, e.g. bypassing the bridge process and preventing single point bottleneck. Exchanging messages between a local machine and a remote machine using RDMA protocol is disclosed in U.S. application Ser. No. 13/415,670, filed Mar. 8, 2012, which is now U.S. Pat. No. 9,116,761, issued on Aug. 25, 2015, entitled "SYSTEM AND METHOD FOR PREVENTING SINGLE-POINT BOTTLENECK IN A TRANSACTIONAL MIDDLEWARE MACHINE ENVIRONMENT," which application is incorporated herein by reference in its entirety.

Supporting a Complex Message Header

In accordance with an embodiment of the invention, a transactional middleware machine environment can use a complex message header in order to support bypassing the bridge processes and prevent single-point bottleneck in transferring messages among machines. The complex message header can use a flexible data structure for supporting different message queues in the transactional middleware machine environment, such as a RDMA message queue and a System V Inter-process Communication (IPC) message queue.

FIG. 1 shows an illustration of a transactional middleware machine environment that supports a complex message header, in accordance with an embodiment of the invention. As shown in FIG. 1, a transactional client 101 can send different service request messages, Message A 104 and Message B 105, to different type of transactional servers, Server A 102 and Server B 103. Sever A can be a first type of server that uses an IPC queue, and Sever B can be a second type of server that uses a RDMA queue. Additionally, a server can listen to both an IPC queue and a RDMA queue at the same time.

In accordance with an embodiment of the invention, a complex message header can use a flexible data structure in order to support bypassing the bridge process and prevent single point bottleneck. As shown in FIG. 1, the Message Header A 106 includes a first data structure A 108 and a second data structure A 110, while the Message Header B 107 includes a first data structure B 109 and a second data structure B 111. Each of the first data structure A 108 and the first data structure B 109 can be a simple data structure that stores address information for accessing a client using the IPC queue. Additionally, the second data structure B 111 in the Message header B 107 can be a data buffer that stores address information for accessing a client using a second message queue, while the second data structure B 110 in the Message header A 106 can be left empty, not in existence, or not created initially.

In the example as shown in FIG. 1, Server A 102, a server that prefer to use a System V IPC queue A 122, can use only the simple data structure 108 to obtain the address information for accessing the client using the IPC message queue C 116, via the bridge process A 120 and the bridge process C 118. On the other hand, Server B 103, a server that prefers to use a RDMA queue, can use the simple data structure 109 to obtain a key 113, e.g. a faked IPC queue address with a negative long value. Furthermore, Server B 103 can use the key 113, or a specified field name, to look up the data buffer to obtain information about the address B 114 for accessing the client using the second message queue.

In accordance with an embodiment of the invention, the client can maintain an IPC queue and a RDMA queue at the same time. Before the client send out a service request message to a target server, the client can first determine the type of a target server based on the information the client receives previously. If the target server is determined to be preferable of using an IPC queue, then the client can send a service request message with a message header in a format similar to Message Header A 106 as shown in FIG. 1. Otherwise, if the target server is determined to be preferable of using a RDMA queue, then the client can send a service request message with a message header in a format similar to Message Header B 107 as shown in FIG. 1.

Figure 2:
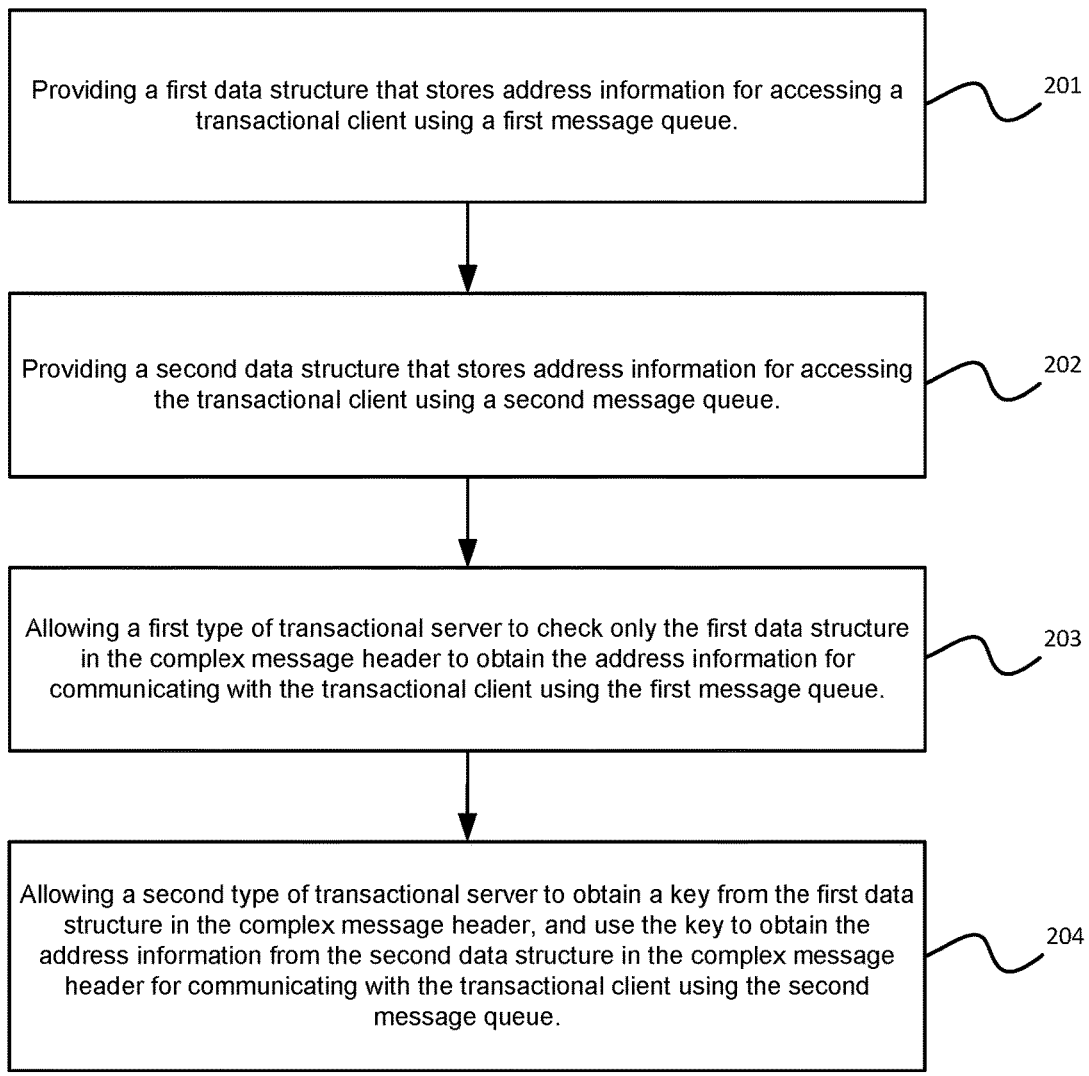
FIG. 2 illustrates an exemplary flow chart for supporting a complex message header in a transactional middleware machine environment, in accordance with an embodiment of the invention.

FIG. 2 illustrates an exemplary flow chart for supporting a complex message header in a transactional middleware machine environment, in accordance with an embodiment of the invention. As shown in FIG. 2, at step 201, a first data structure is provided to store address information for accessing a transactional client using a first message queue. Also, at step 502, a second data structure is provided to store address information for accessing the transactional client using a second message queue. Then, at step 203, a first type of transactional server can check only the first data structure in the complex message header to obtain the address information for communicating with the transactional client using the first message queue. Also, at step 204, a second type of transactional server can obtain a key from the first data structure in the complex message header, and use the key to obtain the address information from the second data structure in the complex message header for communicating with the transactional client using the second message queue.

Carrying Message Queue Information in Tuxedo

In accordance with an embodiment of the invention, a Tuxedo application can take advantage of the RDMA protocol and use RDMA queues in order to bypass the bridge processes associated with the System V IPC queues. The bridge processes associated with the System V IPC queues can be the single-point bottleneck in the Tuxedo environment. Using the RDMA queues, the remote message transfer between different Tuxedo machines can achieve a shorter latency in a manner similar a local message transfer.

Tuxedo client and server can be compiled in different versions and can be deployed in different machines. There is a possibility that not every machine supports the bypass bridge process feature. The system can keep the message compatibility among them. For example, a version of Tuxedo server can access the correct offsets of all fields in Tuxedo message header, although the Tuxedo server does not support the bypass bridge feature. Thus, applications running on Tuxedo from different versions can recognize messages sent from each other.

Figure 3:
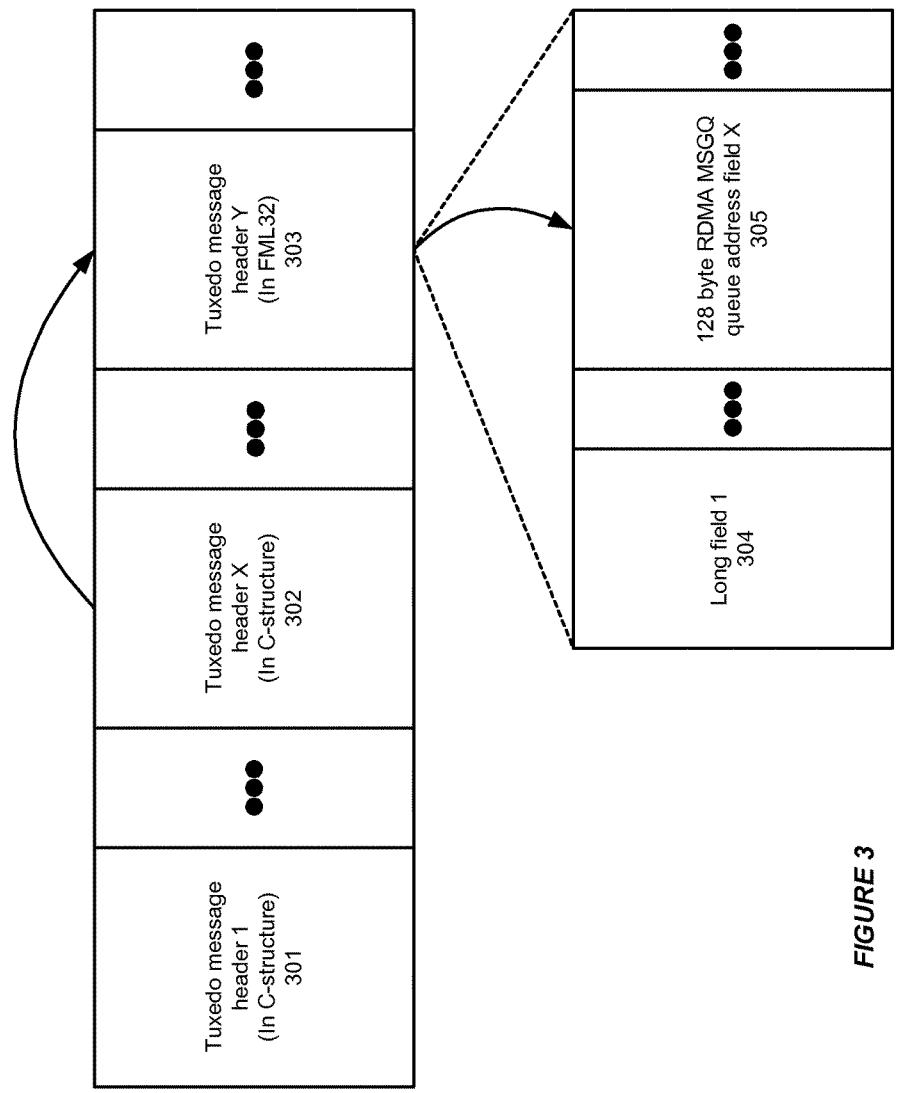
FIG. 3 shows an illustration of a complex message header in a transactional middleware machine environment, in accordance with an embodiment of the invention.

FIG. 3 shows an illustration of a complex message header in a transactional middleware machine environment, in accordance with an embodiment of the invention. As shown in FIG. 3, the complex message header contains several Tuxedo message headers in C-structures 301 and 302 and a Tuxedo message header in a FML32 typed buffer 303.

A client can store System V IPC queue address information in the C-structures. In order to solve the interoperability issue, the C-structures can be kept unchanged at the same location in the message header, even when the bypass bridge feature is activated. Additionally, a client can store its full RDMA message queue information into the flexible transactional header, for example in the FML32 typed buffer header 303, with IDs that are not used for System V IPC queue address.

The RDMA message queue information in the FML32 typed buffer generally contains more bytes than the System V IPC queue address information in the C-structures. For example, the C-structure in a Tuxedo request message header contains an eight (8)-bytes "long" variable, while the RDMA message queue address is an array of 128 bytes.

The FML32 typed buffer is a field-indexed flexible transactional data structure. Every entry in the FML32 typed buffer can be retrieved by a specified field name. If a process gets an FML32 typed buffer, the process does not cause any trouble if the process does not get a value via a field name it does not know. Furthermore, it is not likely that any process may try to get a value via a field that it does not know.

In accordance with an embodiment of the invention, dynamic numbers of fields 304 and 305 can be put into the same buffer that is accessible via specified IDs. When the bypass bridge feature is not activated, the process does not look into the FML32 header, and the process only have access to the System V IPC queue, since the C-structure header is not changed.

When the bypass bridge feature is activated, a client can use the RDMA message queue instead of the System V IPC queue to send messages to server, and can store its reply RDMA message queue address in the request message so that the server can send the response back.

As shown in FIG. 3, when a Tuxedo server process receives a message from a Tuxedo client, the Tuxedo server process can first get the IPC queue address in the C-structures, e.g. the Tuxedo message header X 302. If the Tuxedo server process finds out that the entry has a negative long value, then the Tuxedo server process can get the RDMA message queue address via specified field name from the Tuxedo message header Y 303, which is in a FML32 typed buffer.

Furthermore, a Tuxedo client can get the version information from the server before sending the request. Thus, for the servers compiled without the bypass bridge feature, only System V IPC queue addresses can be put into the request message header, and the FML32 typed buffer is not touched.

When the bypass bridge feature is disabled, there is no RDMA message queue address field in the FML32 buffer 303. The queue address in message buffer (C-structure part) can be a positive IPC queue address, which indicates a System V IPC queue address. Thus, when Tuxedo gets this queue address from message buffer, the system does not look into the FML32 buffer.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting using different types of message queues in a transactional middleware machine environment, comprising:
   a computer including a microprocessor;
   a transactional server operating on the computer, wherein the transactional server is configured to communicate with a transactional client through either a first type of message queue or a second type of message queue;
   a message structure including a message header, wherein the message header includes a first data structure configured to store address information of the first type of message queue, or a key, and a second data structure configured to store address information of the second type of message queue;
   wherein the transactional server, after receiving a message with the message structure from the transactional client, operates to
   determine if a particular entry in the first data structure in the received message includes the address information of the first type of message queue,
   if the particular entry includes the address information of the first type of message queue, use that address information to communicate with the transactional client through the first type of message queue,
   if the particular entry does not include the address information of the first type of message queue, and instead includes a key, obtain the key from the first data structure, and use the key to obtain the address information of the second type of message queue from the second data structure for communicating with the transactional client through the second type of message queue.

2. The system of claim 1, wherein the transactional client operates to store
the address information of the first type of message queue in the first data structure, or
the key in the first data structure and the address information of the second type of message queue in the second data structure.

3. The system of claim 2, wherein the transactional client determines, based on information that the transactional client receives previously from the transactional server, whether to store the address information of an appropriate type of message queue in the message header.

4. The system of claim 1, wherein the first data structure is a C data structure and the second data structure is a typed buffer data structure.

5. The system of claim 1, wherein a local bridge process used by the transactional client to communicate with the transactional server is bypassed when the message includes the key in the first data structure.

6. The system of claim 1, wherein the first type of message queue is an inter-process communication (IPC) queue, and the second type of message queue is a remote direct memory access (RDMA) queue.

7. The system of claim 1, wherein the second data structure is a flexible transactional data structure with a dynamic number of fields, each of which is accessible via a specified ID.

8. A method for supporting using different types of message queues in a transactional middleware machine environment, the method executing on one or more microprocessors and comprising:
configuring a transactional server operating on one or more microprocessors to communicate with a transactional client through either a first type of message queue or a second type of message queue;
providing a message structure for use in transferring messages between the transactional client and the transactional server, the message structure including a message header, wherein the message header includes a first data structure configured to store address information of the first type of message queue, or a key, and a second data structure configured to store address information of the second type of message queue;
receiving, at the transactional server, a message with the message structure from the transactional client;
determining if a particular entry in the first data structure in the received message includes the address information of the first type of message queue; and
performing one of the steps of
using that address information to communicate with the transactional client through the first type of message queue, if the particular entry includes the address information of the first type of message queue, or
obtaining the key from the first data structure, and using the key to obtain the address information of the second type of message queue from the second data structure for communicating with the transactional client through the second type of message queue, if the particular entry does not include the address information of the first type of message queue, and instead includes a key.

9. The method of claim 8, wherein the transactional client operates to store
the address information of the first type of message queue in the first data structure, or
the key in the first data structure and the address information of the second type of message queue in the second data structure.

10. The method of claim 9, wherein the transactional client determines, based on information that the transactional client receives previously from the transactional server, whether to store the address information of an appropriate type of message queue in the message header.

11. The method of claim 8, wherein the first data structure is a C data structure and the second data structure is a typed buffer data structure.

12. The method of claim 8, wherein a local bridge process used by the transactional client to communicate with the transactional server is bypassed when the message includes the key in the first data structure.

13. The method of claim 8, wherein the first type of message queue is an inter-process communication (IPC) queue, and the second type of message queue is a remote direct memory access (RDMA) queue.

14. The method of claim 8, wherein the second data structure is a flexible transactional data structure with a dynamic number of fields, each of which is accessible via a specified ID.

15. A non-transitory computer readable storage medium, including instructions stored thereon, which when read and executed by a computer cause the computer to perform the steps comprising:
configuring a transactional server operating on one or more microprocessors to communicate with a transactional client through either a first type of message queue or a second type of message queue;
providing a message structure for use in transferring messages between the transactional client and the transactional server, the message structure including a message header, wherein the message header includes a first data structure configured to store address information of the first type of message queue, or a key, and a second data structure configured to store address information of the second type of message queue;
receiving, at the transactional server, a message with the message structure from the transactional client;
determining if a particular entry in the first data structure in the received message includes the address information of the first type of message queue; and
performing one of the steps of
using that address information to communicate with the transactional client through the first type of message queue, if the particular entry includes the address information of the first type of message queue, or
obtaining the key from the first data structure, and using the key to obtain the address information of the second type of message queue from the second data structure for communicating with the transactional client through the second type of message queue, if the particular entry does not include the address information of the first type of message queue, and instead includes a key.

16. The non-transitory computer readable storage medium of claim 15, wherein the transactional client operates to store
the address information of the first type of message queue in the first data structure, or the key in the first data structure and the address information of the second type of message queue in the second data structure.

17. The non-transitory computer readable storage medium of claim 16, wherein the transactional client determines, based on information that the transactional client receives previously from the transactional server, whether to store the address information of an appropriate type of message queue in the message header.

18. The non-transitory computer readable storage medium of claim 15, wherein the first data structure is a C data structure and the second data structure is a typed buffer data structure.

19. The non-transitory computer readable storage medium of claim 15, wherein a local bridge process used by the transactional client to communicate with the transactional server is bypassed when the message includes the key in the first data structure.

20. The non-transitory computer readable storage medium of claim 15, wherein the first type of message queue is an inter-process communication (IPC) queue, and the second type of message queue is a remote direct memory access (RDMA) queue.

* * * * *

UNITED STATES PATENT AND TRADEMARK OFFICE
CERTIFICATE OF CORRECTION

PATENT NO. : 9,690,638 B2  
APPLICATION NO. : 13/415712  
DATED : June 27, 2017  
INVENTOR(S) : Shi et al.

Page 1 of 1

It is certified that error appears in the above-identified patent and that said Letters Patent is hereby corrected as shown below:

On the Title Page

On page 2, Column 2, under Other Publications, Line 26, delete "Performace" and insert -- Performance --, therefor.

On page 2, Column 2, under Other Publications, Line 33, delete "Jniversity" and insert -- University --, therefor.

In the Specification

In Column 1, Line 30, delete "8,832,217" and insert -- 8,832,217, --, therefor.

Signed and Sealed this  
Twentieth Day of February, 2018

Andrei Iancu  
*Director of the United States Patent and Trademark Office*